US010152473B2

(12) United States Patent
Wang et al.

(10) Patent No.: US 10,152,473 B2
(45) Date of Patent: Dec. 11, 2018

(54) ENGLISH INPUT METHOD AND INPUT DEVICE

(71) Applicant: BEIJING SOGOU TECHNOLOGY DEVELOPMENT CO., LTD., Beijing (CN)

(72) Inventors: Yi Wang, Beijing (CN); Hong Zhao, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/122,354

(22) PCT Filed: Aug. 18, 2015

(86) PCT No.: PCT/CN2015/087377
§ 371 (c)(1),
(2) Date: Aug. 29, 2016

(87) PCT Pub. No.: WO2016/041428
PCT Pub. Date: Mar. 24, 2016

(65) Prior Publication Data
US 2016/0371251 A1    Dec. 22, 2016

(30) Foreign Application Priority Data
Sep. 17, 2014  (CN) .......................... 2014 1 0475386

(51) Int. Cl.
*G06F 17/27* (2006.01)
*G06F 3/023* (2006.01)
(52) U.S. Cl.
CPC ............ *G06F 17/276* (2013.01); *G06F 3/023* (2013.01); *G06F 17/2735* (2013.01); *G06F 17/2765* (2013.01)

(58) Field of Classification Search
CPC ............ G06F 17/276; G06F 17/30867; G06F 17/30616
See application file for complete search history.

(56) References Cited

U.S. PATENT DOCUMENTS 8,738,356 B2 * 5/2014 Suzuki .................... G06F 17/27
704/2
8,798,250 B1 * 8/2014 Li .......................... H04M 3/42
379/201.01

(Continued)

FOREIGN PATENT DOCUMENTS

CN    101546226 A    9/2009
CN    101546228 A    9/2009

(Continued)

OTHER PUBLICATIONS

The World Intellectual Property Organization (WIPO) International Search Report for PCT/CN2015/087377 dated Oct. 28, 2015 pp. 1-6.

Primary Examiner — Scott Baderman
Assistant Examiner — Mario M Velez-Lopez
(74) Attorney, Agent, or Firm — Anova Law Group, PLLC

(57) ABSTRACT

The present disclosure provides an English input method and device. The English input method includes the following steps. An input English character string having an original length is received. A target length is calculated based on the original length of the English character string. A target English word having a length between the original length and the target length is looked up. A longest common length between the target English words and the English character string is calculated, where the common length refers to a length of identical letters. The target English words are returned when the longest common length is equal to N times the target length, where N is a positive number less (Continued)

than or equal to 1. Even when a user forgets the exact spelling of an English word or enters only a fraction of the spelling, the user may still obtain the required English word based on the inputted English character string, substantially improving operability.

18 Claims, 3 Drawing Sheets

(56) References Cited

U.S. PATENT DOCUMENTS

| | | | | |
|---|---|---|---|---|
| 9,069,818 B2* | 6/2015 | Gorti | ............... | G06F 17/30448 |
| 9,110,515 B2* | 8/2015 | Sharan | ................. | G06F 3/0236 |
| 9,218,333 B2* | 12/2015 | Liensberger | ............ | G06F 17/24 |
| 9,633,674 B2* | 4/2017 | Sinha | .................... | G10L 25/00 |
| 9,659,002 B2* | 5/2017 | Medlock | ............ | G06F 3/0237 |
| 9,760,559 B2* | 9/2017 | Dolfing | ................ | G06F 17/277 |
| 2002/0129012 A1* | 9/2002 | Green | ............. | G06F 17/30616 |
| 2006/0142997 A1* | 6/2006 | Jakobsen | ............. | G06F 3/0237 |
| | | | | 704/10 |
| 2006/0149557 A1* | 7/2006 | Kaneko | ................ | G06F 17/273 |
| | | | | 704/277 |
| 2007/0074131 A1* | 3/2007 | Assadollahi | ......... | G06F 3/0237 |
| | | | | 715/816 |
| 2007/0294076 A1* | 12/2007 | Shore | .................. | G06F 17/2836 |
| | | | | 704/2 |
| 2008/0126075 A1* | 5/2008 | Thorn | .................... | G06F 3/0237 |
| | | | | 704/3 |
| 2010/0283736 A1* | 11/2010 | Akabane | .............. | G06F 17/276 |
| | | | | 345/168 |
| 2011/0202836 A1* | 8/2011 | Badger | ................. | G06F 3/0237 |
| | | | | 715/702 |
| 2012/0223889 A1* | 9/2012 | Medlock | ............ | G06F 3/04883 |
| | | | | 345/168 |
| 2013/0314352 A1* | 11/2013 | Zhai | .................... | G06F 3/04886 |
| | | | | 345/173 |
| 2014/0067372 A1* | 3/2014 | Pasquero | ............. | G06F 17/276 |
| | | | | 704/9 |
| 2015/0089435 A1* | 3/2015 | Kuzmin | ................ | G06N 5/003 |
| | | | | 715/773 |
| 2015/0355836 A1* | 12/2015 | Gummadidala | .... | G06F 3/04886 |
| | | | | 715/773 |

FOREIGN PATENT DOCUMENTS

| | | |
|---|---|---|
| CN | 101727271 A | 6/2010 |
| CN | 102117122 A | 7/2011 |
| CN | 102236423 A | 11/2011 |
| CN | 104281275 A | 1/2015 |

* cited by examiner

ENGLISH INPUT METHOD AND INPUT DEVICE

CROSS-REFERENCES TO RELATED APPLICATIONS

This application is a national stage entry of PCT Patent Application No. PCT/CN2015/087377, filed on Aug. 18, 2015, which claims the priority of Chinese Patent Application No. CN201410475386.1, filed on Sep. 17, 2014, the entire contents of all of which are incorporated herein by reference.

FIELD OF THE DISCLOSURE

The present disclosure generally relates to the input method technology and, more particularly, relates to an English input method and an English input device.

BACKGROUND

With the widespread popularity of electronic devices, especially the widely used mobile devices, users often use electronic devices to perform a variety of tasks, such as communications, web browsing, and micro-blogging, etc. Users often need to use some input methods to enter texts, including English words.

When entering an English word, a generic input method often uses an autocomplete or word association algorithm to make English word suggestions, such that, when a user does not remember the exact spelling of an English word, the user may enter a word prefix and obtain the correct word.

For example, when a user is trying to enter the word "successful", the user may enter the first five letters "succe", and an input method automatically searches words with a length more than 5 letters in a dictionary. If any word has the first 5 letters matching "succe", this word is appearing as the candidate for word suggestions, such as "success", "succeed", successful", etc. Thus, the user enters a partial spelling of a word, looks through automatically generated word suggestions, and selects a word the user intends to enter.

However, in the existing input methods, the letters entered by the user and the leading letters of words in the dictionary must match exactly to provide any associated words. When the user enters an incorrect partial spelling of an intended word, conventional input methods are unable to provide properly associated words. For example, when the user enters "scce", conventional input methods are unable to provide properly associated words such as "success", "succeed", succession", and "successive", etc.

Thus, when a user entered partial spelling contains error, conventional input methods are unable to provide properly associated words. As a result, the user can incur high operation and time cost, and the input efficiency is low. In addition, the electronic device may have to respond repeatedly to page-turning operations, etc., wasting a lot of system resources.

BRIEF SUMMARY OF THE DISCLOSURE

The present disclosure solves the technical problems by providing an English input method. The English input method simplifies user's operation, reduces time and cost of operation, improves input efficiency, and reduces system resource consumption.

Accordingly, the present disclosure also provides an English input device to ensure the implementation and application of the English input method.

In order to solve the problems set forth above, the present discloses an English input method. The English input method includes the following steps. An input English character string having an original length is received. A target length is calculated based on the original length of the English character string. A target English word having a length between the original length and the target length is looked up. A longest common length between the target English words and the English character string is calculated, where the common length refers to a length of identical letters. The target English words are returned when the longest common length is equal to N times the target length, where N is a positive number less than or equal to 1.

Optionally, the identical letters for the common length appear in a same order in the target English word and the input English character string.

Optionally, the step of calculating a target length according to the original length of the input English character string includes calculating a ratio of the original length of the English character string over a pre-configured similarity threshold, and obtaining the target length.

Optionally, the step of looking up a target English word having a length between the original length and the target length includes: assigning the original length of an input English character string to a pre-configured intermediate variable, determining whether the intermediate variable is greater than the target length, retrieving English words having a length equal to the intermediate variable from a pre-configured English word database to obtain the target English words when the intermediate variable is not greater than the target length, incrementing the intermediate variable by one and proceeding to the step of determining whether the value stored in the intermediate variable is greater than the target length.

Optionally, the pre-configured English word database includes one or more segments. English words in each segment have a same length. The English words in each segment are sorted according to a frequency of use.

Optionally, the step of calculating a longest common length between the target English words and the input English character string includes using a dynamic programming method to calculate the longest common length between the target English word and the input English character string.

Optionally, the step of returning the target English words includes sorting the target English words and returning the sorted target English words.

The present disclosure also discloses an English input device. The English input device includes an English character string receiving module configured to receive an input English character string having an original length, a target length calculation module configured to calculate a target length according to the original length of the English character string, a target English word lookup module configured to look up a target English word having a length between the original length and the target length, a common length calculation module configured to calculate a longest common length between the target English word and the English character string, where the common length refers to a length of identical letters, and an English word return module configured to return the target English words when the longest common length is equal to N times the original length, where N is a positive integer less than or equal to 1.

Optionally, the identical letters for the common length appear in a same order in the target English word and the input English character string.

Optionally, the target length calculation module includes a ratio calculation sub-module configured to calculate a ratio of the original length of the English character string over a pre-configured similarity threshold to obtain the target length.

Optionally, the target English word lookup module includes an assignment sub-module configured to assign the original length of the English character string to a preconfigured intermediate variable, a determination sub-module configured to determine whether the intermediate variable is greater than the target length and to proceed to a retrieval sub-module when the value of the intermediate variable is not greater than the target length, a retrieval sub-module configured to retrieve an English word having a length equal to the intermediate variable from a pre-configured English word database to obtain a target English word, and an increment sub-module configured to increment the intermediate variable by one and to proceed to the determination sub-module.

Optionally, the pre-configured English word database includes one or more segments. English words in each segment have a same length. The English words in each segment are sorted according to a frequency of use.

Optionally, the common length calculation module includes a dynamic programming calculation sub-module configured to calculate a longest common length between a target English word and the input English character string by using a dynamic programming method.

Optionally, the English word return module includes a sorting sub-module configured to sort a list of target English words and a return sub-module configured to return the sorted target English words.

Compared with the conventional technology, the present disclosure includes the following advantages.

The present disclosure calculates a target length based on an original length of an received English character string, looks up a target English word having a length between the original length and the target length, calculates a longest common length between the target English word and the English character string where the common length refers to a length of identical letters, and returns the target English word when the longest common length is equal to N times the target length where N is a positive number less than or equal to 1. When a user forgets the exact spelling of an English word or enters only a fraction of the intended English word, the user may still obtain the required English word based on the input English character string as part of the intended English word. The method substantially streamlines the process of entering English words by the user and improves the user experience. Further, the method tolerates user mistakes by accepting the input English character string in a wrong order, with extra characters, or with other mistakes. The method significantly improves the relevance of the returned English words. When completing the input English character string into English words, the number of returned English words may be reduced substantially by calculating the common length such that redundant English words may be eliminated to reduce the screen display space and paging effort by the user. Thus, the user operation is simplified, the operation time is shortened, the input efficiency is increased, and the electronic equipment system resource consumption due to multiple paging is reduced.

DETAILED DESCRIPTION

In order to make the objectives, features, advantages of the present disclosure more easily understood, the present disclosure is further described in detail with accompanying drawings and exemplary embodiments.

Figure 1:
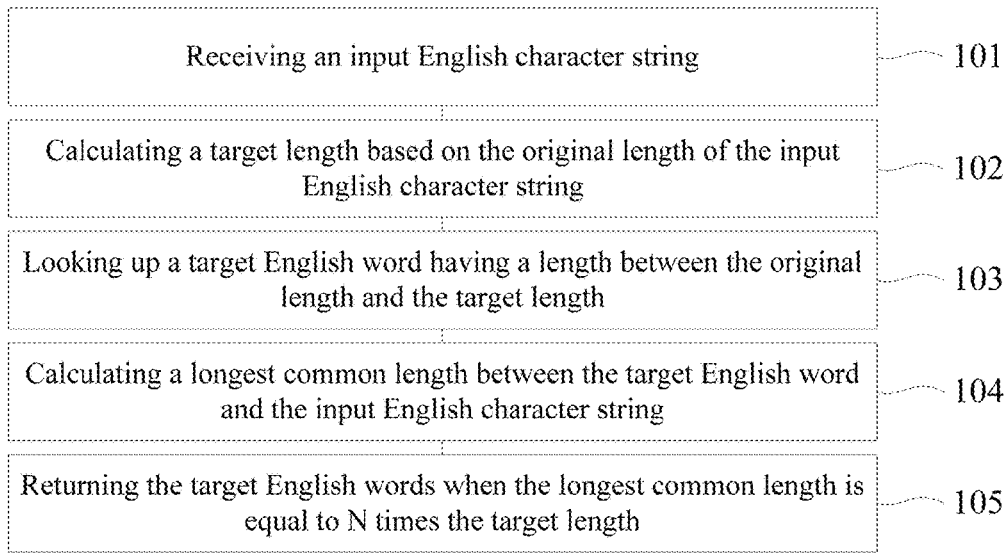
FIG. 1 illustrates a flow chart of an exemplary English input method according to the disclosed embodiments.

FIG. 1 illustrates a flow chart of an exemplary English input method according to the present disclosure. Specifically, as shown in FIG. 1, the English input method may include the following steps.

Step 101: receiving an input English character string.

It should be noted that the English input method according to the present disclosure may be used in electronic equipment having an input device. The electronic equipment may include a mobile phone, a personal digital assistant (PDA), a laptop computer, and a tablet computer, etc. The present disclosure does not limit the types of electronic equipment.

The electronic equipment may support operating systems including Windows, Android, IOS, and Windows Phone, etc. Generally, the electronic equipment often runs an input application program by using a virtual keyboard, a voice input device, or a physical keyboard. The virtual or physical keyboards may be a nine-square keyboard, or a full size standard keyboard (such as QWERT keyboard), etc. The input application program may include an input method program, an instant messaging or real time chat application, and a web browser, etc.

Generally, the virtual or physical keyboard may include one or more keys that are often multiplexed and can be used to enter a string of characters. Specifically, such character string may include, but is not limited to, at least one of numeric character strings, English character strings, Chinese character strings, and symbolic character strings.

In real life applications, a user may click on keys of a virtual keyboard, or may slide between keys of the virtual keyboard (i.e., sliding input), or may press keys of a physical keyboard, or may vocally input languages (i.e., voice input), etc. to enter an English character string.

Further, the English input device according to the present disclosure may be located in the front, both sides or the rear of the display screen of an electronic equipment to detect any touch control information by a user to the virtual keyboard to detect clicking of keys.

Figure 2A:
FIGS. 2A-2B illustrate an exemplary virtual keyboard according to the disclosed embodiments.
Figure 2B:
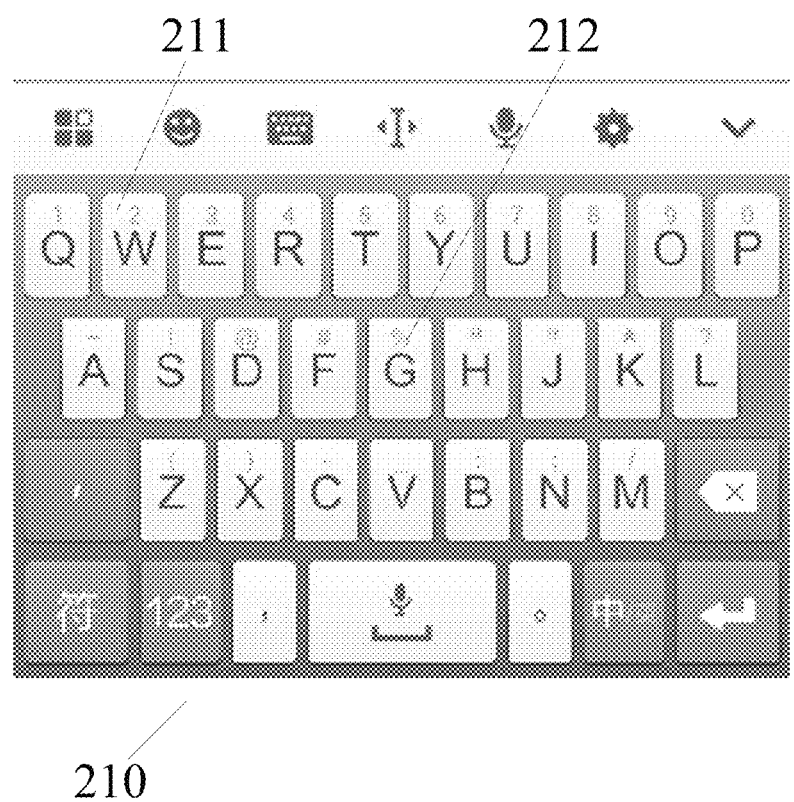

For example, FIGS. 2A-2B illustrate an exemplary virtual keyboard according to the present disclosure.

The virtual keyboard 200 may be a nine-square keyboard or a 9-key keyboard, primarily including nine virtual keys. When the key 201 is clicked or slid through, an English character string "D", "E", "F", "d", "e", or "f" may be entered.

The virtual keyboard 210 may be a full size keyboard or a 26-key keyboard. A full size or 26-key keyboard may be a QWERT keyboard, primarily including 26 virtual keys. When the key 211 is clicked or slid through, an English character string "W" or "w" may be entered. When the key 212 is clicked or slid through, an English character string "G" or "g" may be entered.

The English character string may have an original length. The original length may be the number of English characters in the English character string.

For example, when an English character string is "scful", the English character string has an original length of 5. In another example, when an English character string is "ssful", the English character string has an original length of 5.

Step 102: calculating a target length based on the original length of the English character string.

In one embodiment, a target length may be a length of the longest or shortest English words respectively after the English character string is completed or corrected.

In another embodiment, the step 102 may include a number of sub-steps as follows.

Sub-step S11: calculating a ratio of the original length of the English character string over a pre-configured similarity threshold to obtain the target length.

Specifically, the similarity is a similarity between the input English character string and an English word in the pre-configured English word database. The similarity may be calculated by dividing the length of the English character string by the length of the corresponding English word (i.e., similarity=English character string length/English word length).

In one embodiment, a similarity threshold may be pre-configured. The ratio of the original length of the English character string over the similarity threshold may be calculated to obtain a maximum length of the English words after the English character string is completed.

It should be noted that the similarity threshold may be adjusted according to the learning situation.

For example, when the input English character string is "scful" and the pre-configured similarity threshold is ½, the target length will be 5/(½)=5*2=10. The returned English word may include "successful". When the pre-configured similarity threshold is ⅓, the target length will be 5/(⅓)=5*3=15. The returned English words may include "successful" and "successfully".

Step 103: looking up a target English word having a length between the original length and the target length.

Specifically, English words may be stored in a pre-configured English word database such that target English words having a length between the original length and the target length may be looked up in the pre-configured English word database.

In one embodiment, the English word database may include one or more groups. Specifically, the groups may be divided by the length of the English words. Such groups may also be referred to as word segments. A segment length of a word segment may be the length of the English words in the word segment. The English words in each group or word segment may have a same length (i.e., segment length).

The English words in each group or word segment may be sorted according to the frequency of use. That is, in each word segment, the English words may be sorted in a descending or ascending order according to the frequency of use.

It should be noted that the English word database may be divided into two types: a system English word database, and a user English word database. The system English word database may store the frequency of use for a particular English word for certain user group and the frequency of use may not change according to the input statistics of the current user. On the other hand, the user English word database may store the frequency of use for a particular English word for the current user and the frequency of use may be adjusted according to the input statistics of the current user.

In one embodiment, the English input method may search the user English word database first to sort a certain English word according to the frequency of use for the current user. Then, the English input method may search the system English word database to sort the English word according to the frequency of use for a certain user group.

In certain other embodiments, the English input method may search the system English word database first to sort a certain English word according to the frequency of use for a certain user group. Then, the English input method may search the user English word database to sort the English word according to the frequency of use for the current user. Alternatively, the English input method may only search the system English word database to sort a certain English word according to the frequency of use for a certain user group. Alternatively, the English input method may only search the user English word database to sort the English word according to the frequency of use for the current user. The present disclosure does not limit the search order of the two types of English word databases.

In real life applications, because the input method program requires a demanding response speed, the English word database may be stored in a binary format in the system memory.

The following descriptions are based on an exemplary English word database. The English word database includes English words, "hi", "hello", "good", "happy", "how", "what", and "name".

The table below shows the segments of the exemplary English word database.

| Sequence number of word segments | Starting position of English words | Number of English words | Starting position of the data |
|---|---|---|---|
| 0 | 0 | 0 | 0 |
| 1 | 0 | 0 | 0 |
| 2 | 0 | 1 | 0 |
| 3 | 1 | 1 | 0 + 1 * 2 |
| 4 | 2 | 3 | 2 + 1 * 3 |
| 5 | 5 | 2 | 5 + 2 * 4 |
| 6 | 7 | 0 | 13 + 2 * 5 |

For example, the word segment (i.e., group) of sequence number 3 stores English words having a segment length (i.e., word length) of 3. In the table above, there is only one English word before the word segment of sequence number 3. That is, the word segment of sequence number 3 is immediately after the first English word (i.e., the starting position of English words). The number of English words having a segment length (i.e., word length) of 3 in the word segment (i.e., group) of sequence number 3 is one in total. The data for the only English word in the word segment of sequence number 3 is stored in the English word database starting at the byte number 0+1*2=2.

The table below includes a list of data corresponding to each word segment in the English word database.

| Sequence number of English words | Starting position of data | Note |
|---|---|---|
| 0 | 0 + 0 * 2 | hi |
| 1 | 2 + 0 * 3 | how |
| 2 | 5 + 0 * 4 | good |
| 3 | 5 + 1 * 4 | what |
| 4 | 5 + 2 * 4 | name |
| 5 | 13 + 0 * 5 | hello |
| 6 | 13 + 1 * 5 | happy |

For example, the English word of sequence number 2 is "how", which has a segment length (i.e., word length) of 3, belongs to the word segment of sequence number 3, and is the data stored at the byte number 2+0*3=2 (i.e., the starting position of data) in the English word database.

When a user enters an English character string "how" having an original length of 3, the user often does not intend to enter an English word having a length less than 3. In order to quickly look up the corresponding English words, the English input method may divide the English word database into groups according to length of words. In this case, the English input method may only need to search word segments (i.e., groups) having a segment length equal to or greater than 3. That is, only word segments with the sequence number 3, 4, and 5 will be searched instead of searching the entire English word database.

In real life applications, a GetSegmentPhraseDataPtr (an English word database pointer, a segment length, an offset in the word segment) function may be called to look up target English words having a length between the original length and the target length. For example, executing GetSegmentPhraseDataPtr (2, 3, 9) may return the English word "what".

In this case, the English word database pointer may refer to an address in the system memory pointing to the starting position of data in the segmented table. The segment length may refer to the sequence number of a word segment. The segment offset of the English word may refer to a relative address in the word segment pointing to the starting position of data in the data table. In one embodiment, the step 103 may include the following sub-steps.

Sub-step S21: assigning the original length of an English character string to a pre-configured intermediate variable.

Sub-step S22: determining whether the intermediate variable is greater than the target length, and proceeding to sub-step S23 when the intermediate variable is not greater than the target length, or returning target English words when the intermediate variable is greater than the target length.

Sub-step S23: retrieving English words having a length equal to the intermediate variable from a pre-configured English word database to obtain target English words.

Sub-step S24: incrementing the intermediate variable by one and proceeding to sub-step S22.

The above sub-steps may traverse all English words in the English word database having a length between the original length and the target length by gradually incrementing the intermediate variable (e.g., incrementing by 1) to obtain target English words.

In another embodiment, the step 103 may include the following sub-steps.

Sub-step S31: assigning the target length of an English character string to a pre-configured intermediate variable.

Sub-step S32: determining whether the intermediate variable is less than the original length, and executing sub-step S33 when the intermediate variable is not less than the original length, or returning the target English words when the intermediate variable is less than the original length.

Sub-step S33: retrieving English words having a length equal to the intermediate variable from a pre-configured English word database to obtain target English words.

Sub-step S34: decrementing the intermediate variable by one and proceeding to sub-step S32.

The above sub-steps may traverse all English words in the English word database having a length between the original length and the target length by gradually decrementing the intermediate variable (e.g., decrementing by 1) to obtain the target English words.

Of course, the above traversing methods are for illustrations only. In real life applications, other traversing methods, such as random selection, may be used to satisfy the actual needs. The present disclosure does not limit the traversing methods. In addition to the determination processing methods described above, those skilled in the art may use other processing methods according to the actual requirements. The present disclosure does not limit the processing methods.

Step 104: calculating a longest common length between the target English word and the English character string.

It should be noted that the common length may be a length of identical letters. Further, the order of identical letters for the common length may be the same in both the target English word and the English character string. That is, the common length may be the length of identical letters.

For example, an English character string "scful" and a target English word "successful" have identical letters "scful" in the same order. Thus, the longest common length for both is 5.

In another example, an English character string "scful" and a target English word "scale" have identical letters "scl" in the same order. Thus, the longest common length for both is 3.

In one embodiment, the step 104 may include the following sub-step.

Sub-step S41: using a dynamic programming method to calculate a longest common length between a target English word and an English character string.

Dynamic programming method is a mathematical optimization method for solving decision making problems in operations research. Dynamic programming is a generic optimization method for multi-stage decision making process.

The following example illustrates that the dynamic programming method is used to calculate a maximum common sub-sequence (for example, a longest common length) between two sequences (for example, an English character string and a target English word).

For example, two sequences may be X and Y.

A two-dimensional array f[i, j] may be used to represent a length of a maximum common sub-sequence before the i-th character in X sequence and the j-th character in Y sequence. Thus, the equation (1) and the equation (2) may be obtained.

$$f[1][1]=same(1,1) \qquad (1)$$

$$f[0]=\max\{f[i-1][j-1]+same(i,j),f[i-1,j],f[i,j-1]\} \qquad (2)$$

where same(a,b)=1 when the a-th character in X sequence and the b-th character in Y sequence are identical, and same(a,b)=0 otherwise.

At this point, the maximum number in the two-dimensional array may be the length of the longest common sub-sequence between sequence X and sequence Y. The longest common sub-sequence may be found by traversing the two-dimensional array backward.

Of course, the above calculation of the longest common length between two sequences is for illustration only. In real life applications, other calculation method may be used to calculate the longest common length according to the actual requirement. The present disclosure does not limit the calculation methods.

For example, common sub-sequences may be enumerated directly from the English character string and the target English word. Then, a longest common sub-sequence may be selected from the enumerated common sub-sequences. The length of the longest common sub-sequence may be the longest common length.

Specifically, each sub-sequence of sequence S may be inspected to determine whether such sub-sequence is also a sub-sequence of sequence T. Thus, whether such sub-sequence is a common sub-sequence between sequence S and sequence T may be determined, and the longest common sub-sequence may be selected.

After all sub-sequences of sequence S and sequence T are inspected, a longest common sub-sequence between sequence S and sequence T may be obtained. When members of sequence S are labeled by subscripts 1, 2, . . . , n (n is a positive integer), sequence S may have a total of $2^n$ sub-sequences. Similarly, when members of sequence T are labeled by subscripts 1, 2, m (m is a positive integer), sequence T may have a total of $2^m$ sub-sequences.

In another example, a longest common length between a target English word and an English character string may be calculated by using a recursive method.

Specifically, the first characters of two character strings (for example, an English character string and a target English word) are compared. When the two first characters are the same, the same character may be appended to the end of a known common sub-sequence and then the same algorithm is recursively applied to the two remaining sequences after the first character is removed from both sequences. When the two first characters of two character strings are not the same, three possible alignment strategies may be used to calculate three potential longest common sub-sequences. Then, the longest of the three may be selected to compare with a longest common sub-sequence currently known. When the calculated longest common sub-sequence is longer than the longest common sub-sequence currently known, the longest common sub-sequence currently known is replaced by the calculated longest common sub-sequence.

In the recursive method described above, a first alignment strategy is removing the first character of the first sequence and then applying the recursive method to the remaining first sequence and the second sequence. A second alignment strategy is removing the first character of the second sequence and then applying the recursive method to the first sequence and the remaining second sequence. A third alignment strategy is removing the first character of both sequences and then applying the recursive method to the remaining first sequence and the remaining second sequence.

In another example, a longest common length between a target English word and an English character string may be calculated by using a double-recursive method.

Specifically, an alignment position may be determined for the first sequence (for example, the English character string) in the first recursion. An alignment position may be determined for the second sequence (for example, the target English word) in the second recursion. In each pair of recursions, two alignment positions may be determined for a set of two sequences. A longest common sub-sequence between the two sequences may be matched or calculated from the re-aligned positions of the two sequences. When the calculated longest common sub-sequence is longer than the longest common sub-sequence currently known, the longest common sub-sequence currently known will be replaced by the calculated longest common sub-sequence.

Step 105: when the longest common length is equal to N times the target length, returning the target English words, where N is a positive number equal to or less than 1.

Specially, when the common length is N times the target length, the target English words may be returned for the user to choose.

When the user makes mistakes in entering characters (for example, the user wants to enter the letter "a" and instead the user enters the letter "s", adjacent to the letter "a"), or enters letters for a word in wrong order, or enters extra letters, the longest common length is often less than the target length. Thus, N may be configured as a positive number less than 1 to tolerate user mistakes. For example, the user enters an English character string of 5 letters. When the longest common length between the English character string and a retrieved target English word is 4 and N is 0.8, the retrieved target English word may be returned.

Specifically, the user may make a mistake by entering extra letters when entering a word. For example, the user wants to enter the word "hello". But the letter "l" key may get stuck briefly such that the user enters "helllo" instead. The extra letter "l" is entered by mistake. Thus, the longest common length is often less than the target length, and N may be configured as a positive number less than 1.

Further, when N=1 or the longest common length is equal to the target length, fewer number of target English words with high relevancy may be returned.

It should be noted that English words in the segmented English word database are pre-sorted according to the frequency of use in each segment. English words having a short length may have a stronger similarity. At the same time, in order to save processing time and memory space, such target English words may not be sorted at all.

In another embodiment, the step 105 may include the following sub-steps.

Sub-step S51: sorting the target English words.

Sub-step S52: returning the sorted target English words.

In one embodiment, the target English words are sorted before being returned such that the target English words more likely to be chosen may be presented with higher priority. Thus, the user may go through fewer pages to find the intended word.

Specifically, the target English words may be sorted according to the frequency of use. For example, certain target English words that are used more frequently by the current user may be sorted to the front. Certain target English words that are used more frequently by certain user group may be sorted to the front as well. The current user's frequency of use has a higher priority than the user group's frequency of use. The target English words may also be sorted according to the current scenario. For example, when the user is searching a video content website, the target English words that belong to video category may be sorted to the front. The target English words may be sorted according to the context. For example, a natural language processing (NLP) technique may be used to calculate usage probabilities for the target English words that are compatible with the context. Then, the target English words may be sorted according to the calculated usage probabilities. The present disclosure does not limit the sorting methods.

The present disclosure provides an English input method. The original length of the received English character string may be used to calculate a target length. Target English words having a length between the original length and the target length may be searched in a pre-configured English word database. When a longest common length between a target English word and the English character string is same as the original length, the target English words may be returned. When a user forgets the exact spelling of an English word or enters only a fraction of the intended English word, the user may still obtain the required English word based on the input English character string as part of the intended English word. The method substantially streamlines the process of entering English words by the user and improves the user experience. Further, the method tolerates user mistakes by accepting the input English character string in a wrong order, with extra characters, or with other mistakes. The method significantly improves the relevance of the returned English words.

When completing the input English character string into English words, the number of returned English words may be reduced substantially by calculating the common length such that redundant English words may be eliminated to reduce the screen display space and paging effort by the user. Thus, the user operation is simplified, the operation time is shortened, the input efficiency is increased, and the electronic equipment system resource consumption due to multiple paging is reduced.

The following specific examples are used to illustrate the English input method according to the present disclosure to enable those skilled in the art to better understand the present invention.

Figure 3:
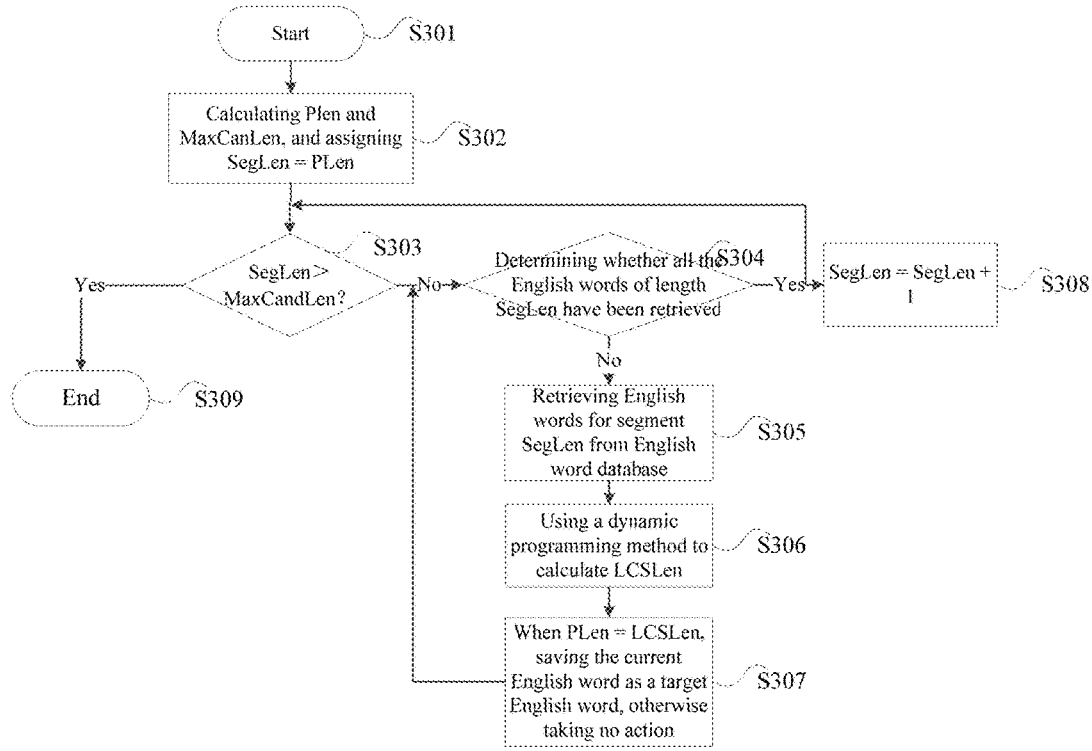
FIG. 3 illustrates a flow chart of another exemplary English input method according to the disclosed embodiments.

FIG. 3 illustrates a flow chart of another exemplary English input method according to the present disclosure. As shown in FIG. 3, the English input method may include the following steps.

Step S301: starting the process.

Step S302: calculating an original length PLen of an input English character string and a target length MaxCanLen, and assigning the original length PLen to an intermediate variable SegLen (SegLen=PLen).

Step S303: determining whether the intermediate variable is greater than the target length MaxCabLen, and proceeding to Step S309 when the intermediate variable is greater than the target length MaxCabLen, or proceeding to Step S304 when the intermediate variable is not greater than the target length MaxCabLen.

Step S304: determining whether all the English words having a length of the intermediate variable SegLen in the pre-configured English word database have been retrieved, and proceeding to Step S308 when all the English words having a length of the intermediate variable SegLen in the pre-configured English word database have been retrieved, or proceeding to Step S305 when not all the English words having a length of the intermediate variable SegLen in the pre-configured English word database have been retrieved.

Step S305: retrieving English words from an English word segment (i.e., group) in the pre-configured English word database, which has a segment length equal to the intermediate variable.

Step S306: using a dynamic programming method to calculate a longest common length LCSLen between the input English character string and an English word.

Step S307: when the original length PLen is equal to the longest common length LCSLen (PLen=LCSLen), saving the current English word as a candidate, obtaining the target English words, returning the target English words to the user, or when the original length PLen is not equal to the longest common length LCSLen (PLen LCSLen), proceeding to Step S304.

Step S308: incrementing the intermediate variable by one (SegLen=SegLen+1), and proceeding to Step S303.

Step S309: ending the process.

For example, an input English character string is "scful", which has an original length PLen of 5. Assuming the similarity threshold is set to $1/3$, a longest common length LCSLen is $5/(1/3)=3*5=15$. The original length PLen is assigned to an intermediate variable SegLen, i.e., SegLen=5. All the English words in the segments of the English word database having a segment length between 5 and 15 will be retrieved. A longest common length is calculated between each such word and the English character string "scful". When the calculated longest common length for an English word is equal to 5, this English word is returned to the user as a target English word. Specifically, the returned target English words may be "successful" and "successfully".

In another example, an input English character string is "scfll", which has an original length PLen of 5. Assuming the similarity threshold is set to $1/3$, a longest common length LCSLen is $5/(1/3)=3*5=15$. The original length PLen is assigned to an intermediate variable SegLen, i.e., SegLen=5. All the English words in the segments of the English word database having a segment length between 5 and 15 will be retrieved. A longest common length is calculated between each such word and the English character string "scfll". When the calculated longest common length for an English word is equal to 5, this English word is returned to the user as a target English word. Specifically, the returned target English words may be "successfully" and "specifically".

In another example, the user wants to enter the English word "successfully" and does not remember the exact spelling. But the user may remember the pronunciation of the English word or certain key letters. The user may enter an English character string "scful" or "ssful" based on the pronunciation or the impression of the spelling. The method according to the present disclosure may return two English words "successful" and "successfully" to the user. When the user enters an English character string "scfuly" or "scfuly", only one English word "successfully" will be returned to the user. Thus, such English input operation is convenient and improves the user experience.

In another example, the user may enter an English character string "helllo", which has an original length PLen of 6. Assuming the similarity threshold is set to 1.2, a longest common length LCSLen is $6/1.2=5$. The original length PLen is assigned to an intermediate variable SegLen, i.e., SegLen=6. All the English words in the segments of the English word database having a segment length between 6 and 5 will be retrieved. A positive number N is set to between 0.8 and 1. A retrieved English word "hello" and the input English character string "helllo" have a longest common length LCSLen of 5. The ratio of the longest common length LCSLen over the original length PLen is 0.83. Because the ratio falls within the value range of N, the English word "hello" will be returned to the user.

In various embodiments described above, in order to simplify the specification, the English input method according to the present disclosure has been described as a combination of a series of actions. Those skilled in the art may understand that the sequences of the combination of a series of actions are not limited to the descriptions provided. Other sequences of actions or simultaneous actions may be used as well. Further, the various embodiments described in the specification are for illustration purpose. The combinations of actions may not be mandatory implementations.

Figure 4:
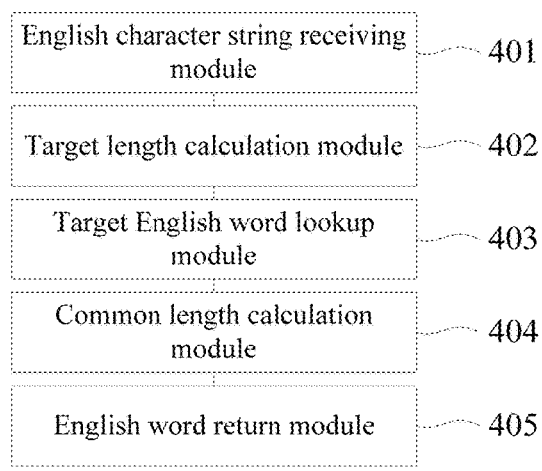
FIG. 4 illustrates a block diagram of an exemplary English input device according to the disclosed embodiments.

FIG. 4 illustrates a block diagram of an exemplary English input device according to the present disclosure. Specifically, as shown in FIG. 4, the English input device may include the following modules:

an English character string receiving module 401 configured to receive an input English character string having an original length;

a target length calculation module 402 configured to calculate a target length according to the original length of the English character string;

a target English word lookup module 403 configured to look up a target English word having a length between the original length and the target length;

a common length calculation module 404 configured to calculate a longest common length between the target English word and the English character string, where the common length refers to a length of identical letters; and an English word return module 405 configured to return the target English words when the longest common length is equal to N times the original length, where N is a positive integer less than or equal to 1.

In one embodiment, the identical letters of the common length may be arranged in a same order.

In another embodiment, the target length calculation module 402 may include the following sub-module:

a ratio calculation sub-module configured to calculate a ratio of the original length of the English character string over a pre-configured similarity threshold to obtain the target length.

In another embodiment, the target English word lookup module 403 may include the following sub-modules:

an assignment sub-module configured to assign the original length of the English character string to a preconfigured intermediate variable;

a determination sub-module configured to determine whether the value of the intermediate variable is greater than the target length and to proceed to a retrieval sub-module when the value of the intermediate variable is not greater than the target length;

a retrieval sub-module configured to retrieve an English word having a length equal to the intermediate variable from a pre-configured English word database to obtain a target English word; and an increment sub-module configured to increment the intermediate variable by one and to proceed to the determination sub-module.

In another embodiment, the English word database may include one or more segments. The English words in each segment may have a same length (i.e., segment length). The English words in each segment may be sorted according to the frequency of use.

In another embodiment, the common length calculation module 404 may include the following sub-module:

a dynamic programming calculation sub-module configured to calculate a longest common length between a target English word and the input English character string by using a dynamic programming method.

In another embodiment, the English word return module 405 may include the following sub-module:

a sorting sub-module configured to sort a list of target English words; and a return sub-module configured to return the sorted target English words.

Because the various embodiments of the English input device according to the present disclosure are substantially similar to that of the English input method, more detailed descriptions of the English input device may refer to the descriptions of the English input method.

The present disclosure also provides a computer accessible media to store the program for executing the disclosed English input method.

The computer accessible media may include any mechanism for storing or transmitting information in a computer accessible format. For example, such computer machine accessible media may include read-only memory (ROM), random access memory (RAM), magnetic disk storage media, optical storage media, flash storage media, and electrical, optical, acoustical or other format signals (e.g., carrier signal, infrared signal, digital signal, etc.).

The various embodiments in the specification are described in a progressive manner. Only the differences between various embodiments are highlighted while the common portions of the various embodiments are referenced but not repeated.

The embodiments of the present invention may be implemented as an English input method, an English input device, or a computer program implementing the disclosed English input method. The embodiments of the present invention may be implemented in hardware, in software, or in a combination of hardware and software. Moreover, the embodiments of the present invention may be implemented in one or more computer program products on computer accessible storage media containing computer executable program code (including but not limited to magnetic disk storage, CD-ROM, optical storage, etc.).

The embodiments of the present invention are described according to the embodiments of the English input method, the English input device, and the flow charts and/or block diagrams of the computer program products. It should be understood that computer program instructions are implementing each and every step and/or function module of the flow charts and/or block diagrams, and various combinations of the steps and/or function modules of the flow charts and/or block diagrams. Such computer program instructions may be provided to any generic computers, specialized computers, embedded processors, or other programmable data processing terminals to produce a machine such that program codes that can be executed by computers or processors of other programmable data processing terminals may be used to implement one or more steps of the flow charts and/or one or more function modules of the block diagrams for the device.

The computer program instructions may also be stored in a computer accessible memory to instruct a computer or other programmable data processing terminal to operate in a particular mode such that the computer program instructions stored in the computer accessible memory may produce an article of manufacture including instruction means. The instruction means may implement one or more steps of the flow chart and/or the functions of one or more function modules of the block diagram.

The computer program instructions may be loaded into a computer or other programmable data processing terminal to make the computer or the other programmable data processing terminal execute a series of operations to implement one or more steps of the flow charts and/or the functions of one or more function modules of the block diagrams.

Although various embodiments of the present invention have been described, those skilled in the art may make additional changes and modifications to these embodiments according to the basic innovative concepts. Therefore, the invention defined by the claims appended hereto is intended to include various embodiments and all the modifications and variations within the scope of present disclosure.

Finally, it should be noted that, as used herein, relational terms such as "first", "second", etc are only used to differentiate one element or operation from another and should not be construed as giving the limitation on the number or sequence of the elements or operations. Moreover, the term "comprising", "including" or any other variation thereof are intended to cover a non-exclusive inclusion, such that a series of factors including process, method, article, or terminal device include not only those elements, but also not explicitly listed other elements, including elements intrinsic to such process, method, article, or terminal device. Without more constraints, the statement "includes a" defining elements do not exclude the existence of additional identical elements of process, method, article, or terminal device.

The specification provides detailed description for an English input method and an English input device according to the present disclosure. Specific embodiments of the invention have been presented for purposes of illustrating the principles of the invention and the practical implementations. The foregoing description of the embodiments of the invention is only used to help understand the methods and core ideas of the present disclosure. At the same time, ordinary people skilled in the art who understand the scope of the invention may make changes or modifications to various embodiments and applications. As such, the content of the specification should not be construed as limitations to the scope of the invention.

What is claimed is:

1. An English input method, comprising:
   receiving, by an electronic equipment, an input English character string having an original length, wherein the electronic equipment includes an input device and runs an input application program compatible with the input device for obtaining user inputs;
   calculating, by the electronic equipment, a target length based on the original length of the English character string;
   looking up, by the electronic equipment, a target English word having a length between the original length and the target length;
   automatically calculating, by the electronic equipment, a longest common length between the target English word and the English character string by using a dynamic programming method, where the common length refers to a length of identical letters between the target English word and the input English character string, so that when the English character string inputted by the user skips one or more characters from the target English word, the longest common length allows the target English word to be identified; and
   returning, by the electronic equipment, the target English word when the longest common length is equal to N times the target length so that the target English word is a correctly-spelled word to tolerate user mistakes in the input English character string, where N is a positive number less than or equal to 1.

2. The English input method of claim 1, wherein:
   the identical letters for the common length appear in a same order in the target English word and the input English character string.

3. The English input method of claim 1, wherein calculating a target length according to the original length of the input English character string includes:
   calculating a ratio of the original length of the English character string over a pre-configured similarity threshold, and obtaining the target length.

4. The English input method of claim 1, wherein looking up a target English word having a length between the original length and the target length includes:
   assigning the original length of an input English character string to a pre-configured intermediate variable;
   determining whether the intermediate variable is greater than the target length;
   when the intermediate variable is not greater than the target length, retrieving English words having a length equal to the intermediate variable from a pre-configured English word database to obtain the target English words; and
   incrementing the intermediate variable by one and proceeding to the step of determining whether the value stored in the intermediate variable is greater than the target length.

5. The English input method of claim 4, wherein:
   the pre-configured English word database includes one or more segments;
   English words in each segment have a same length; and
   the English words in each segment are sorted according to a frequency of use.

6. The English input method of claim 5, wherein returning the target English words includes:
   sorting the target English words; and
   returning the sorted target English words.

7. The method according to claim 1, wherein automatically calculating the longest common length between the target English word and the English character string by using the dynamic programming method comprises:
   given that a two-dimensional array f [i, j] represents a length of a maximum common sub-sequence before the i-th character in the target English word and the j-th character in the English character string, and f [1][1]=same (1,1), wherein when the a-th character in the target English word and the b-th character in the English character string are identical, same(a,b)=1, and otherwise same(a,b)=0,
   obtaining the longest common length using the following formula $$f[i,j]=\max\{f[i-1][j-1]+\text{same}(i,j), f[i-1,j], f[i,j-1]\}.$$

8. An English input device, comprising:
   a memory;
   a processor coupled to the memory; and
   program modules stored in the memory to be executed by the processor, the program modules comprising:
   an English character string receiving module configured to receive an input English character string having an original length, wherein the English input device runs a compatible input application program for obtaining user inputs;
   a target length calculation module configured to calculate a target length according to the original length of the English character string;
   a target English word lookup module configured to look up a target English word having a length between the original length and the target length;
   a common length calculation module configured to automatically calculate a longest common length between the target English word and the English character string by using a dynamic programming method, where the common length refers to a length of identical letters between the target English word and the input English character string, so that when the English character string inputted by the user skips one or more characters from the target English word, the longest common length allows the target English word to be identified; and an English word return module configured to return the target English words when the longest common length is equal to N times the original length so that the target English word is a correctly-spelled word to tolerate user mistakes in the input English character string, where N is a positive integer less than or equal to 1.

9. The English input device of claim 8, wherein:
the identical letters for the common length appear in a same order in the target English word and the input English character string.

10. The English input device of claim 8, wherein the target length calculation module includes a ratio calculation sub-module configured to calculate a ratio of the original length of the English character string over a pre-configured similarity threshold to obtain the target length.

11. The English input device of claim 8, wherein the target English word lookup module includes:
an assignment sub-module configured to assign the original length of the English character string to a preconfigured intermediate variable;
a determination sub-module configured to determine whether the intermediate variable is greater than the target length and to proceed to a retrieval sub-module when the value of the intermediate variable is not greater than the target length;
a retrieval sub-module configured to retrieve an English word having a length equal to the intermediate variable from a pre-configured English word database to obtain a target English word; and
an increment sub-module configured to increment the intermediate variable by one and to proceed to the determination sub-module.

12. The English input device of claim 11, wherein:
the pre-configured English word database includes one or more segments;
English words in each segment have a same length; and
the English words in each segment are sorted according to a frequency of use.

13. The English input device of claim 12, wherein the English word return module includes:
a sorting sub-module configured to sort a list of target English words; and
a return sub-module configured to return the sorted target English words.

14. A non-transitory computer accessible media configured to store computer program instructions implementing the English input method, the method comprising:
receiving, by an electronic equipment, an input English character string having an original length, wherein the electronic equipment includes an input device and runs an input application program compatible with the input device for obtaining user inputs;
calculating, by the electronic equipment, a target length based on the original length of the English character string;
looking up, by the electronic equipment, a target English word having a length between the original length and the target length;
automatically calculating, by the electronic equipment, a longest common length between the target English word and the English character string by using a dynamic programming method, where the common length refers to a length of identical letters between the target English word and the input English character string, so that when the English character string inputted by the user skips one or more characters from the target English word, the longest common length allows the target English word to be identified; and
returning, by the electronic equipment, the target English word when the longest common length is equal to N times the target length so that the target English word is a correctly-spelled word to tolerate user mistakes in the input English character string, where N is a positive number less than or equal to 1.

15. The non-transitory computer accessible media of claim 14, wherein:
the identical letters for the common length appear in a same order in the target English word and the input English character string.

16. The non-transitory computer accessible media of claim 14, wherein calculating a target length according to the original length of the input English character string includes:
calculating a ratio of the original length of the English character string over a pre-configured similarity threshold, and obtaining the target length.

17. The non-transitory computer accessible media of claim 14, wherein looking up a target English word having a length between the original length and the target length includes:
assigning the original length of an input English character string to a pre-configured intermediate variable;
determining whether the intermediate variable is greater than the target length;
when the intermediate variable is not greater than the target length, retrieving English words having a length equal to the intermediate variable from a pre-configured English word database to obtain the target English words; and
incrementing the intermediate variable by one and proceeding to the step of determining whether the value stored in the intermediate variable is greater than the target length.

18. The non-transitory computer accessible media of claim 17, wherein:
the pre-configured English word database includes one or more segments;
English words in each segment have a same length; and
the English words in each segment are sorted according to a frequency of use.

* * * * *